April 25, 1939.  H. MEYER, SR  2,156,188
VULCANIZING APPARATUS
Filed May 10, 1938
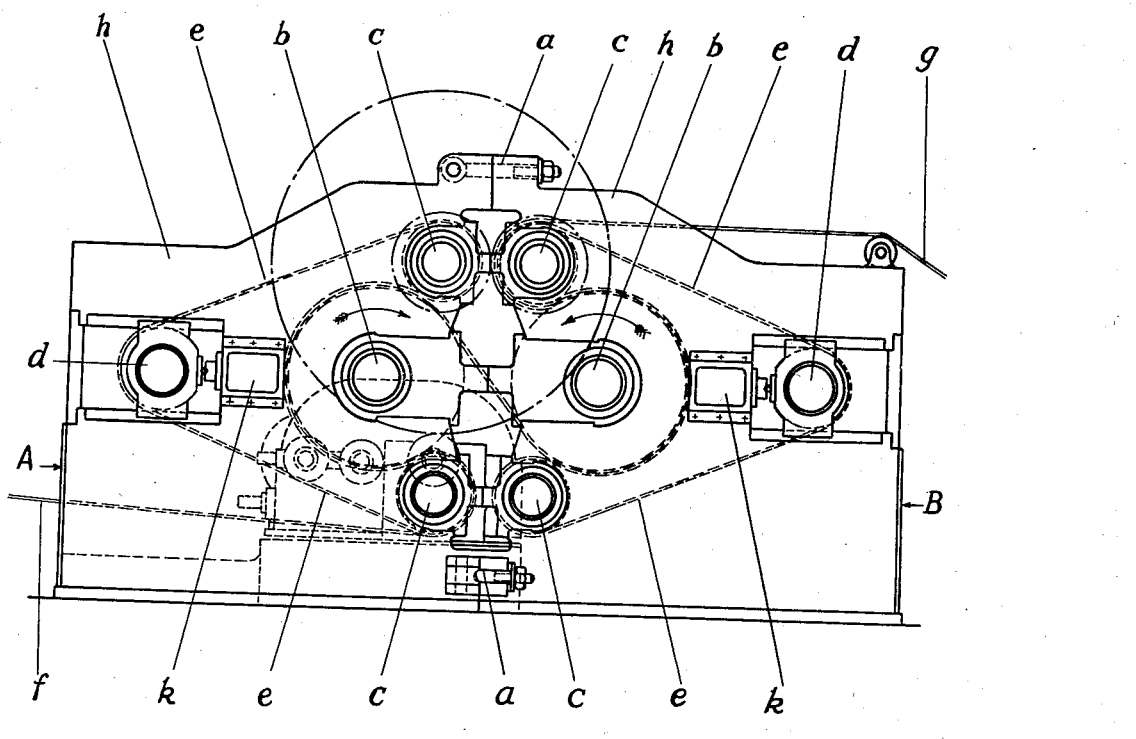
INVENTOR.
H. Meyer Sr.
By
ATTYS.

Patented Apr. 25, 1939

2,156,188

UNITED STATES PATENT OFFICE 2,156,188

VULCANIZING APPARATUS

Hermann Meyer, Sr., Hanover, Germany

Application May 10, 1938, Serial No. 207,123
In Germany June 18, 1935

3 Claims. (Cl. 18—6)

The present invention relates to apparatus for vulcanizing both sides of thick caoutchouc belts and the like.

If the customary continuous process of vulcanization in which the belts are treated between a heated drum and a presser band is used for vulcanizing thick rubber belts such as carrier belts and the like, particularly such belts as are provided with an inserted layer of fabric, the heat of the heating drum is not sufficiently conducted throughout the cross-section of the belt, not even if the surface of the heating drum is utilized at the greater portion of its circumference, and an incomplete vulcanization will result.

The present invention has for its principal object to provide improved apparatus in which the vulcanization of articles of the kind referred to can be properly performed in continuous operation.

It has already been proposed to conduct caoutchouc bands in a loop-shaped or substantially S-shaped path between heating drums onto which they are pressed by presser bands so as to be treated from both sides. In this case two presser bands were used the tension of which must of course be individually adjustable not only relative to the heating drums but also relative to the work band. With two presser bands running on top of each other such an adjustment can only with difficulty be obtained and requires a great amount of time and skill. Furthermore in the known device the heat from the cylinders has to pass through a set of presser bands before reaching the material to be vulcanized.

The customary machines for vulcanizing both sides of caoutchouc tapes have the disadvantage that the heating drums are in contact with the work only along a narrow strip, and the machines in question are only suitable for vulcanizing thin tapes and the like of caoutchouc and could not be used for other vulcanizing purposes of the kind of those with which the present invention is concerned.

In apparatus according to the present invention comprises two vulcanizing machines of a known type each comprising a heating drum or heated cylinder and a presser belt, these two machines being symmetrically arranged opposite each other, and preferably each machine is provided with a separate frame, the two frames being detachably connected with one another.

By means of this apparatus according to the present invention, it is not only possible in a relatively simple manner to properly vulcanize thick rubber belts comprising or not an inserted layer of fabric, but it enables moreover vulcanizing machines of a customary type to be utilized in the manufacture of rubber products of a kind which cannot be properly produced by these machines individually.

In order that the invention may be more readily understood, an embodiment of the invention is, by way of example, illustrated in the drawing, the single figure of which shows the apparatus in a side elevation, in which, in order not to complicate the drawing, certain features which are well known in the art, are not shown in detail.

Referring now to the drawing, A and B are two continuous vulcanizing machines of the type in which the band of caoutchouc to be vulcanized is conducted round the greater portion of the circumference of a heated cylinder $b$, a predetermined pressure of application being maintained by means of a presser band $e$ which is guided in a closed path by means of idler rollers $c$ and a tensioning roller $d$ which is adjustable by means of a tensioning device $k$. Each of the two machines A and B is supported by a frame $h$, and is provided in the usual manner with driving means and means for heating the cylinder $b$. The two machines A and B are symmetrically arranged opposite to each other in such a manner that the rollers $b$ face one another with their portions which are not covered by the presser bands $e$, and screw means $a$ or the like are provided for connecting the frames $h$ together in this position.

In operation the two cylinders $b$ are driven symmetrically as indicated by the arrows, and material $f$ to be vulcanized is conducted in a substantially S-shaped path so as to run in the machine A between the heated cylinder $b$ and the presser band $e$ and subsequently in a similar manner round the cylinder $b$ of the machine B underneath the presser band $e$ of the machine B, whence it leaves the apparatus as indicated at $g$, the idler rollers $c$ being advantageously utilized as indicated for guiding the belt $f$ into and the vulcanized belt $g$ out of the machine. It will be apparent from the foregoing description that the belt $f$ after being heated from one side in the machine A, will subsequently be heated from the opposite side in the machine B.

As each of the two parts A and B of the apparatus is a complete vulcanizing machine, the guiding rollers, tensioning devices and presser bands of each machine being independent from the other machine, the two machines may be separated and individually used for vulcanizing purposes. A further advantage involved by the individual construction of the two parts A and B of the apparatus consists in the fact that after separating the two parts, the cylinders and rollers which in operation are arranged closely together, are readily accessible for revision and repairs, assembling of the apparatus being likewise facilitated by this arrangement.

As each part is provided with a separate tensioning device $k$, the pressure may be regulated as desired and in a given case may be graduated, the same being the case in respect of the degree of heating.

A further advantageous feature of the illustrated construction consists in the fact that the band or belt of caoutchouc heated by the first cylinder is immediately continuously conducted to the second heated cylinder so as to reach in the shortest possible way the second cylinder where it is properly and thoroughly vulcanized from the back.

Having thus particularly described and ascertained my present invention, I claim:

1. An apparatus for vulcanizing both sides of caoutchouc belts or the like, comprising two associated vulcanizing units symmetrically arranged end to end opposite to one another, each unit comprising a vulcanizing cylinder an endless presser band having a portion passing about the major portion of the circumference of the cylinder leaving the remaining portion of the cylinder free from contact with said band, guide rollers adjacent the cylinder positioned to guide the band around said major portion of said cylinder and away from said cylinder and means for tensioning the presser band, said units being arranged with the said remaining portions of the cylinders facing each other whereby the belt may be introduced between the cylinder and presser band of one unit, and passed between the cylinder and band of the said unit, and then lead off the cylinder of said unit and between the cylinder and band of the other unit in a substantially S shaped path round and in contact with the respective cylinders of both units.

2. Apparatus as claimed in claim 1, in which each of the two vulcanizing units is provided with a separate frame.

3. Apparatus as claimed in claim 1, in which each of the two vulcanizing units is provided with a separate frame, and means for detachably connecting the frames of the two units.

HERMANN MEYER, Sr.